Sept. 30, 1924.
B. E. BROADWELL
ELECTRODE FOR ELECTROMETALLURGICAL FURNACES
Filed Oct. 19, 1922
1,510,134
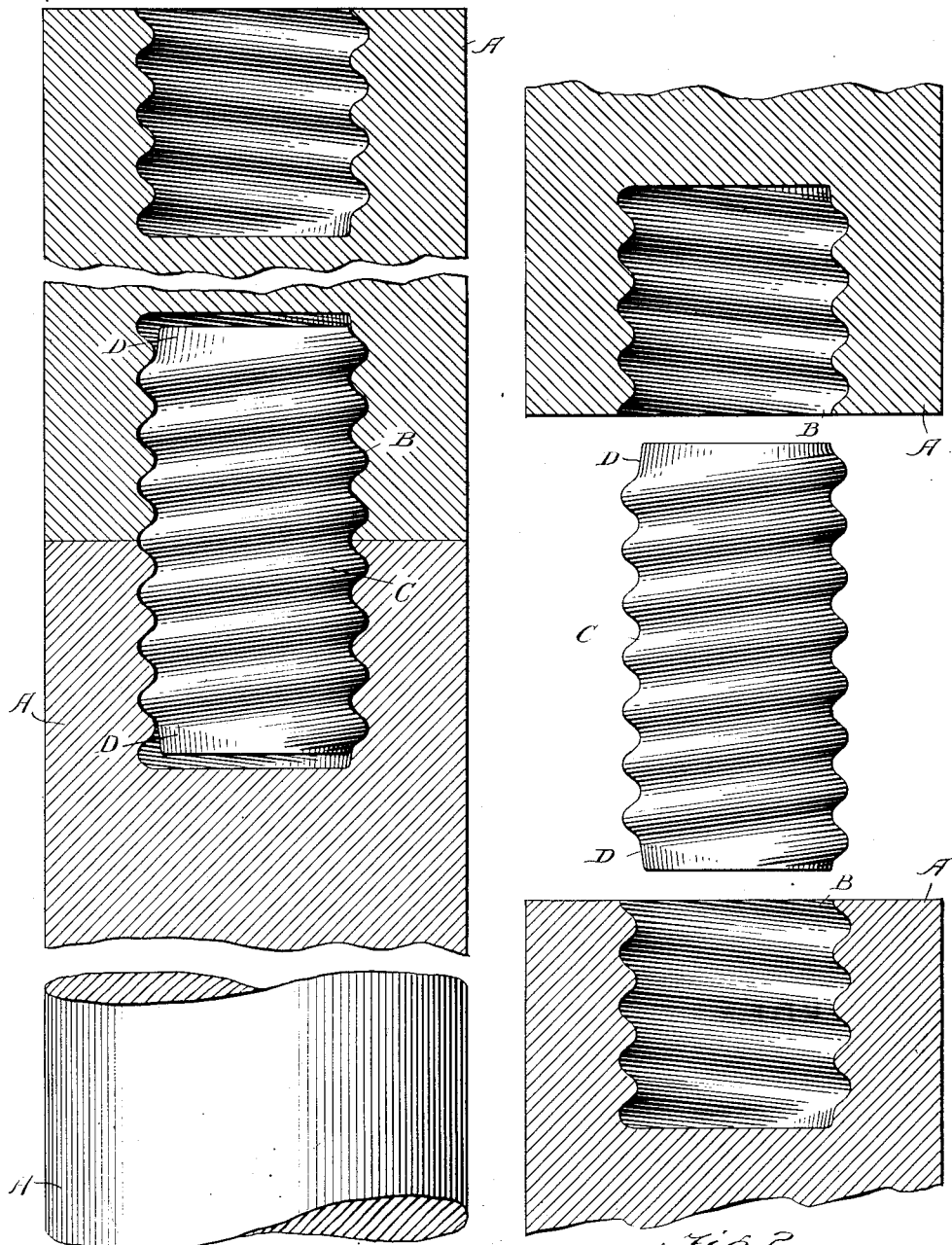

Patented Sept. 30, 1924.

1,510,134

UNITED STATES PATENT OFFICE.

BARTLEY E. BROADWELL, OF NIAGARA FALLS, NEW YORK, ASSIGNOR TO REPUBLIC CARBON COMPANY, INC., OF NIAGARA FALLS, NEW YORK, A CORPORATION OF DELAWARE.

ELECTRODE FOR ELECTROMETALLURGICAL FURNACES.

Application filed October 19, 1922. Serial No. 595,621.

*To all whom it may concern:*

Be it known that I, BARTLEY E. BROADWELL, a citizen of the United States, residing at Niagara Falls, in the county of Niagara and State of New York, have invented certain new and useful Improvements in Electrodes for Electrometallurgical Furnaces; and I do hereby declare the following to be a full, clear, and exact description of the same, reference being had to the accompanying drawings, forming part of this specification.

The development of the electric arc furnace, particularly for electrometallurgical purposes, requires the use of carbonaceous electrodes and frequently of large diameter, commercial electrodes today being made as large as twenty-four inches in diameter and the indications being that this size is by no means the limit. Such electrodes are expensive and modern economical methods demand that they shall be completely utilized with the result that in practice they are made sectional and as the sections are consumed other sections are added to the rear end by a connection usually made of the same material as the electrode and generally in the form of an internal threaded nipple or stud which will hold the ends of the sections together and support the partly consumed electrode while it is being completely consumed.

The object of the present invention is to provide an improved sectional electrode and connector for the sections which will overcome difficulties and defects heretofore existing, and particularly the liability of the electrode to break when, for example, oxidation due to intermittent operation has caused the electrode to erode some distance in rear of its terminus or at the point, where, under former practice, the internal cavity or socket for the nipple or stud was enlarged. Other objects are to improve the nipple or stud so as to avoid breakage in handling; to provide means whereby the sections may be more readily assembled for use, and to reduce the cost of making the sections by the elimination of certain machining operations heretofore found necessary.

In the drawings,—

Figure 1 is an elevation, partly in section, of a sectional electrode embodying the present invention.

Fig. 2 is a similar view with the sections and nipple separated.

The sections A of the body of the electrode are preferably cylindrical or of other proper shape in cross-section, uniformly from end to end, so as to be fed through the electrode holders or supports without binding, and each section is formed in its end face with a screw thread cavity B. The cavities in the several sections coincide in position, whereby they aline accurately when the sections are assembled end to end. For connecting the sections externally screw threaded nipples or studs C are provided to bridge the joint between the sections holding their end faces abutting each other and establishing good electrical contact for the flow of the heavy current employed. The formation of the screw threads is usually a machining operation and in accordance with the present invention, instead of enlarging the bottom of the socket as heretofore, the thread is extended to or approximately to the bottom of the socket and the surrounding wall is left of full thickness and strength with no sharp line of weakness, such as would tend to start a rupture.

The nipple or stud is what is known as an all thread nipple, but in the present instance it is made with the ends frusto-conical, as at D, the end of the thread merging into the conical part and the conical part being adapted not only to enter the socket readily to facilitate coupling, but it forms a clearance at the bottom of the socket which prevents wedging strains at this point, such as would tend to rupture the body of the electrode. This construction of the nipple or stud is not only effective in use, but it removes the liability to chip and break at the ends in handling or in starting the coupling operation. The nipple centers itself, when one heavy electrode is placed over the other.

Both the electrode sections and the nipples are preferably made of carbon of substantially the same grade, so as to have the same coefficient of expansion and electrical conductivity, and the screw threads are preferably of rounded form in cross section to avoid sharp edges and afford the maximum contracting surface for electrical conduction.

In use the sections are added one on top of the other and fed into the furnace through a suitable support or holder, and as they are consumed other sections are successively added.

What I claim is:

1. A sectional carbonaceous electrode for electric furnaces comprising body sections of uniform external contour placed end to end, the meeting ends having formed therein alined screw-threaded sockets which at their inner ends are of no greater diameter than at their outer ends, and a cylindrical nipple having an intermediate portion externally screw-threaded, and end portions free from screw threads and of less diameter than the threaded portion, said nipple fitting in said sockets and forming the union to connect the body sections together with their end faces abutting.

2. A sectional carbonaceous electrode for electric furnaces comprising body sections of uniform external contour placed end to end, the meeting ends having formed therein alined cylindrical screw threaded sockets which at their inner ends are of no greater diameter than at their outer ends, and a cylindrical nipple having an intermediate portion externally screw-threaded and end portions free from screw threads and of frusto-conical form, less in diameter than the threaded portion, said nipple fitting in said sockets and forming the union to connect the body sections together with their end faces abutting.

3. A nipple for uniting the abutting ends of carbonaceous electrodes for electric furnaces, formed of carbonaceous material of cylindrical form with its intermediate portion provided with an external thread of uniform pitch and with end portions free from screw threads and of frusto-conical form less in diameter than the threaded portion.

BARTLEY E. BROADWELL.